United States Patent [19]
Zöllner nee Moller et al.

[11] 3,991,158
[45] Nov. 9, 1976

[54] PREPARATION AND USE OF THALLIUM PALLADATE AS COVER LAYER OF METAL ANODES

[75] Inventors: Christine Zöllner nee Moller; Gerhard Thiele; Dieter Zöllner; Konrad Koziol, all of Schwaig near Nurnberg, Germany

[73] Assignee: C. Conradty, Nuremberg, Germany

[22] Filed: Oct. 22, 1974

[21] Appl. No.: 516,996

[30] Foreign Application Priority Data
Sept. 17, 1974 Germany............................ 2353995

[52] U.S. Cl. ............................ 423/115; 204/290 F; 204/291; 423/593
[51] Int. Cl.$^2$ .................. C01G 15/00; C01G 55/00; C25B 11/04; C25D 17/00
[58] Field of Search...................... 423/22, 115, 593

[56] References Cited
UNITED STATES PATENTS
3,560,144   2/1971   Sleight ............................... 423/593

FOREIGN PATENTS OR APPLICATIONS
1,506,040   12/1967   France ................................ 423/593

*Primary Examiner*—F.C. Edmundson
*Attorney, Agent, or Firm*—Gifford, Chandler & Sheridan

[57] ABSTRACT

Preparation and use of a new electrochemical active substance for the cover layer of metal anodes, which substance is thallium palladate and is obtained as a cardinal-red compound, which is cubic-face-centered, sufficiently characterized in pure crystalline form and, thus, constitutes a new electrochemical active substance for the cover layer of metal anodes.

5 Claims, No Drawings

PREPARATION AND USE OF THALLIUM PALLADATE AS COVER LAYER OF METAL ANODES

BACKGROUND OF THE INVENTION

The present invention relates to the preparation and use of thallium palladate as a new electrochemical active substance for the cover layer of metal anodes.

Certain patents and patent applications, e.g. German Democratic Republic Pat. No. 55,323, German Democratic Republic Pat. No. 77,963, German Published Application No. 1,671,422, German Published Application No. 1,917,040, German Published Application No. 1,813,944, German Published Application No. 1,962,860, and German Published Application No. 2,200,500 disclose metal anodes containing cover layers of the most varying composition in order to eliminate the drawbacks of the anode carrier members of passivatable metal, such as titanium, tantalum, zirconium, niobium, etc.

Most of the above substances, however, suggested for application as cover layer or as essential component thereof have unfortunately turned out to be disadvantageous, because their electrical conductivity and/or their chemical and electrochemical stability is not satisfactory or, respectively, a number of the suggested substances cannot at all or not very easily be applied to the anode carrier member without adversely affecting the requirements made respecting a cover layer.

Whereas for example alkaline earth palladates such as $CaPd_3O_4$, $SrPd_3O_4$ and $NaPd_3O_4$ could already be synthesized in pure crystalline form, a preparation and adequate characterization of $TlPd_3O_4$ was impossible till now.

DESCRIPTION OF THE INVENTION

It is therefore an object underlying the invention to develop a preparation and adequate characterization of a new electrochemical active substance for the cover layer of metal anodes.

It is a further object of the invention to make the new electrochemical active substance adaptable for the use as cover layer of metal anodes. It is moreover a specific object to be solved by the invention to prepare and use cardinal-red thallium palladate for the cover layer of metal anodes, which thallium palladate has favourable electrochemical and electrical properties as active material for coating metal anodes.

According to the invention it is possible to obtain $TlPd_3O_4$ as cardinal-red compound in stoichiometric composition. The reaction takes place already at 500° C. A gas solid-reaction is concerned. As is known, at this temperature the equilbrium

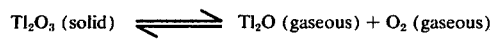

is present.

The preparation is conducted according to the reaction:

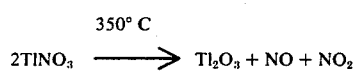

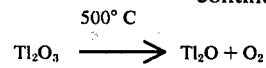

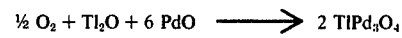

The direct reaction of $Tl_2O_3$ with PdO also leads to the same result.

Below an example for the preparation of the above new electrochemically active substance is given.

EXAMPLE

1 Mol PdO is intimately mixed with 4 to 5 Mol of $TlNO_3$ and is slowly heated to 500°–600° C in sintered corundum trays. In this connection, by decomposition of the thallium nitrates above 300° C the cubic $Tl_2O_3$ results in jet-black crystals which react with PdO starting from 500° C. Excess $Tl_2O_3$ is removed by sublimation at 650° C; palladium by boiling with aqua regia. The cardinal-red reaction product according to guinea photos contains no further impurities.

The analyses of this compound is complicated in so far as $TlPd_3O_4$ is well soluble only in hydrobromic acid, however, the presence of bromide ions is disturbing in the course of the analyses by the formation of the TlBr that is difficult to dissolve and $PdBr_2$. Thus, it was necessary to boil the hydrobromic acid solution of the $TlPd_3O_4$ with a few drops of elementary bromine in order to bring the TlBr which always precipitates in smaller amounts in solution as $TlBr_3$; subsequently to quantitatively expel bromine by boiling with concentrated $HNO_3$ and, since the oxidizing properties of the nitric acid also adversely affect the applied precipitation with organic reagents, to fume them off with sulphuric acid. The gravimetric determination of the thallium was conducted by precipitation with thionalide. Palladium is precipitated with dimethylglyoxim.

| $TlPd_3O_4$ | content of Tl | content of Pd |
|---|---|---|
| calculated | 34,8 % | 54,3 % |
| test results | 34,6 % | 54,8 % |
| | 34,9 % | 54,6 % |
| | 34,9 % | 54,5 % |

$TlPd_3O_4$ under decomposition is readily soluble in constantly boiling hydrobromic acid, is moderately soluble in aqua regia and perchloric acid, is difficult to dissolve in sulphuric acid, nitric acid, formic acid and alkaline solvent. Above 750° C $TlPd_3O_4$ is decomposed while forming elementary palladium and $Tl_2O_3$. The pyknometric density was found to be 8.99 g/cm³ and is well concurring with the X-ray density of 8.83 g/cm³. The radiographic evaluation for $TlPd_3O_4$ resulted in a cubic elementary cell:

| lattice constant | a | = | 9,596 ± 0,002 A |
|---|---|---|---|
| volume of the elementary cell | $V_{Ez}$ | = | 883,68 A³ |
| number of formula units | Z | = | 8 |
| X-ray density | $S_{Ro}$ | = | 5,11 oz/cu.in. |

From the crystal lattice plane statistic the extinction conditions resulted

| hKl: | h + k | = 2n−1 |
| | k + l | = 2n−1 |
| | (h + l) | = 2n−1 |

On the basis of these extinction conditions, the space groups Fm3m—$O_h^5$, F432—$O^3$, F43m — $T_d^2$, Fm3 $T_h^3$ and F23—$T^2$ come into consideration for TlPd$_3$O$_4$.

The raster-electromicroscopic examination resulted in the presence of partially twinned octahedrones.

Viewing the results in combination, they confirm the presence of a cubic face-centered structure.

If one now applies the TlPd$_3$O$_4$ to alloyed or unalloyed metal anode base members together with coadhesives the electrolyses of NACl—, KCl, chlorate- and HCl-solutions can be conducted, as well as of course other electrochemical processes.

A satisfactory electrochemical effectiveness is ensured already when 20% are present in the cover layer. In permanent operation (10.000 A/m²) a thus coated metal-anode worked well over a period of time of 12 months without showing an alteration of the electrical properties as current yield, cell voltage, or electrochemical activity, such as chlorine deposition, resistance of the cover layer against wear.

It is, of course, to be understood that the present invention is, by no means, limited to the particular example, but also comprises any modifications within the scope of the appended claims.

What is claimed is:
1. Method of manufacturing thallium palladate (TlPd$_3$O$_4$) as a cardinal-red cubic face centered compound in stoichiometric composition and pure crystalline form comprising heating of thallium nitrate (TlNO$_3$) to about 350° C to yield cubic Tl$_2$O$_3$ and NO and NO$_2$, heating Tl$_2$O$_3$ to about 500° C to yield Tl$_2$O$^3$ and O$_2$, adding PdO, and effecting the reaction according to the equation

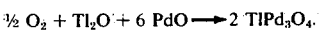

2. Method of manufacturing thallium palladate (TlPd$_3$O$_4$) as a cardinal-red cubic face centered compound in stoichiometric composition and pure crystalline form comprising mixing 1 Mol PdO and 4 to 5 Mol TlNO$_3$, heating the mixture slowly to about 500° to 600° C, removing excess Tl$_2$O$_3$ by sublimation at about 650° C and removing palladium by boiling with aqua regia.

3. The method of making TlPd$_3$O$_4$ comprising the steps of effecting the reaction of Tl$_2$O with PdO in the presence of oxygen at a temperature above about 500° C, and removing excess Tl$_2$O$_3$ and palladium.

4. The method as defined in claim 3 wherein said Tl$_2$O is obtained from heating Tl$_2$O$_3$ at a temperature of about 500°–600° C.

5. The method as defined in claim 4 wherein said Tl$_2$O$_3$ is obtained by heating TlNO$_3$ above about 300° C.